(12) United States Patent
Chu et al.

(10) Patent No.: US 8,064,845 B2
(45) Date of Patent: Nov. 22, 2011

(54) RF TRANSCEIVER HAVING A T/R SWITCH CIRCUIT WITH HIGH POWER-HANDLING CAPABILITY

(75) Inventors: Chun-Hsueh Chu, Hsinchu (TW); Jiunn-Tsair Chen, Hsinchu County (TW)

(73) Assignee: Ralink Technology, Corp., Jhubei, Hsinchu County (TW)

( * ) Notice: Subject to any disclaimer, the term of this patent is extended or adjusted under 35 U.S.C. 154(b) by 471 days.

(21) Appl. No.: 12/325,244

(22) Filed: Nov. 30, 2008

(65) Prior Publication Data

US 2009/0291645 A1 Nov. 26, 2009

(30) Foreign Application Priority Data

May 21, 2008 (TW) ................................ 97118665 A (51) Int. Cl.
*H04B 1/44* (2006.01)

(52) U.S. Cl. ............ 455/78; 455/83; 327/534; 327/535; 327/537

(58) Field of Classification Search ..................... 455/78, 455/83; 333/103; 327/534, 535, 537
See application file for complete search history.

(56) References Cited

U.S. PATENT DOCUMENTS

6,094,088 A * 7/2000 Yano .............................. 327/534
2004/0077316 A1 * 4/2004 Xiong .............................. 455/78
* cited by examiner

*Primary Examiner* — Lincoln Donovan
*Assistant Examiner* — John Poos
(74) *Attorney, Agent, or Firm* — Winston Hsu; Scott Margo (57) ABSTRACT

A RF transceiver includes an antenna, a receiver, a baseband circuit, a transmitter, and a T/R switch circuit. The T/R switch circuit is used for coupling the antenna and the receiver or coupling the antenna and the transmitter. The T/R switch circuit is coupled to the baseband circuit so as to receive biases provided from the baseband circuit. The T/R switch circuit includes four transistors and a power detector. The power detector detects the power of the output signal of the T/R switch circuit, so that the baseband circuit can adjust biases provided to the T/R switch circuit according to the power of the output signal.

10 Claims, 7 Drawing Sheets

| $P_{d/b}$ (dBm) | $V_{DNW}$ (V) | $V_{ctrl}$ (V) | $V_{trlb}$ (V) | $V_{sb}$ (V) | $V_{db}$ (V) |
|---|---|---|---|---|---|
| 25 | 3 | 3 | 0 | 1.2 | 1.2 |
| 28 | 6 | 6 | 0 | 2.4 | 2.4 |
| 30 | 6 | 6 | 0 | 3 | 3 |

RF TRANSCEIVER HAVING A T/R SWITCH CIRCUIT WITH HIGH POWER-HANDLING CAPABILITY

BACKGROUND OF THE INVENTION

1. Field of the Invention

The present invention relates a RF transceiver, and more particularly, to a RF transceiver having a T/R switch circuit with high power-handling capability.

2. Description of the Prior Art

In the wireless communication system, RF front-end circuit is gradually making use of low cost and highly integrated system of complementary metal oxide semiconductor transistors (CMOS) processed products. The transceiver usually uses a common antenna, so the T/R switch circuit functions as a transmitting/receiving path for the antenna. Thus, the T/R switch circuit needs enough isolation, low power consumption, and low insertion loss. In addition, the T/R switch circuit should have high power-handling capability according to the system requirement.

Filed effect transistor (FET) is generally used for T/R switch circuit because its power consumption is almost zero. The GaAs FET is the mainstream due to its low insertion loss and high isolation, but one disadvantage is the negative control voltages. As the development of CMOS process, many RF sub-circuits are developed, such as low noise amplifiers, voltage controlled oscillators, and mixers. In view of system on chip (SOC), the T/R switch circuit produced by CMOS process is necessary. When a transistor functions as a switch, the power consumption of the transistor is zero. The state of the transistor is determined according to the channel of the transistor. When the channel is turned on, the path of the transistor from the source to the drain is equivalent to a resistor having small input impedance. On the other hand, when the channel is turned off, the path of the transistor from the source to the drain is equivalent to a capacitor having great input impedance.

Figure 1:
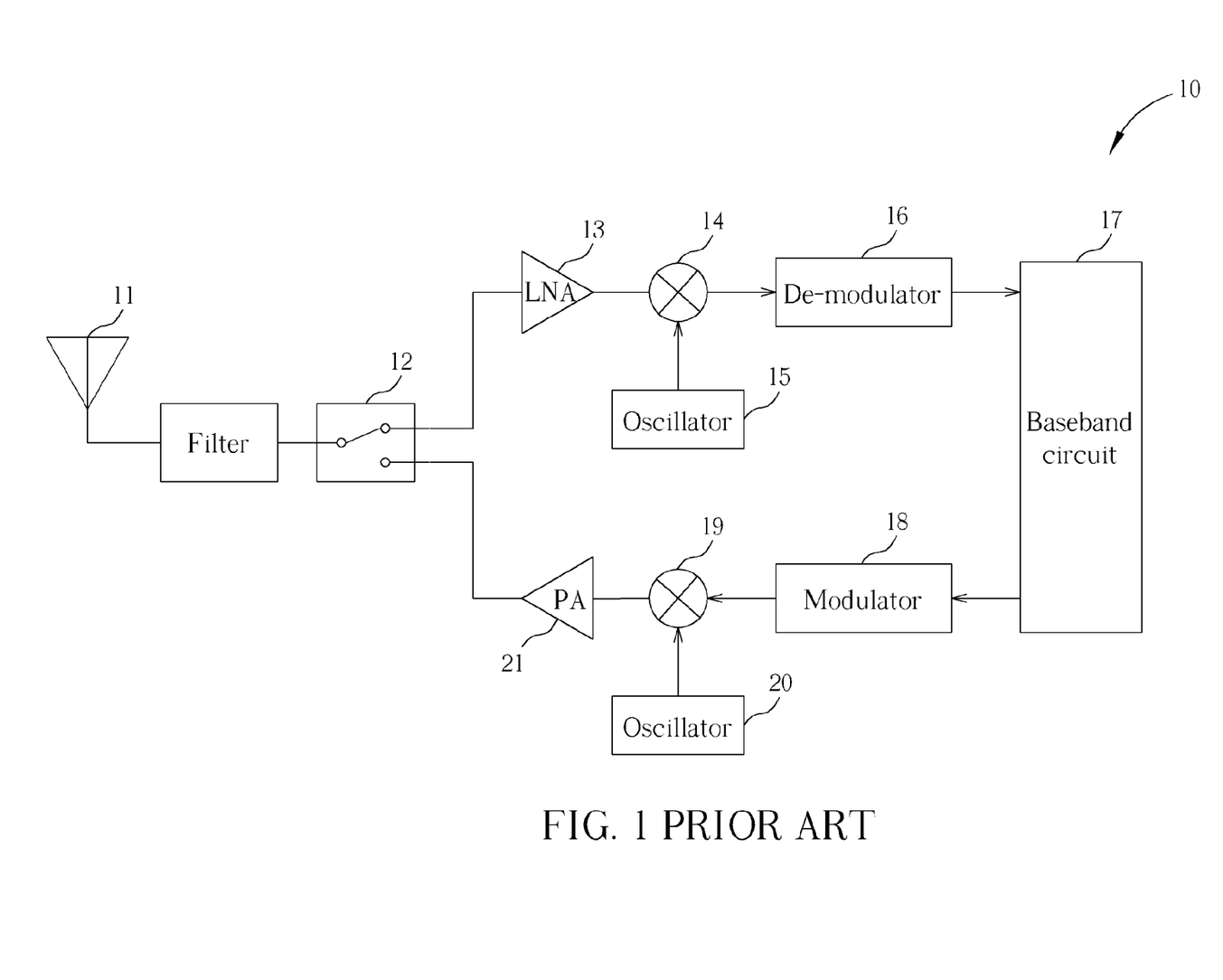
FIG. 1 is a schematic diagram of a conventional RF transceiver.

Please refer to FIG. 1. FIG. 1 is a schematic diagram of a conventional RF transceiver 10. The RF transceiver 10 uses the same antenna 11 to receive and transmit signals, so the RF transceiver 10 uses the T/R switch 12 to switch. The RF transceiver 10 receives a RF signal from the antenna 11. The RF signal is amplified by a low noise amplifier (LNA) 13 and is inputted to a mixer 14 so as to generate an intermediate-frequency or baseband signal according to an oscillating frequency generated by an oscillator 15. A de-modulator 16 converts the intermediate-frequency or baseband signal to a digital signal and transmits to a baseband circuit 17. In addition, when the RF transceiver 10 sends a signal, the baseband circuit 17 transmits a digital signal to a modulator 18. The modulator 18 converts the digital signal to an intermediate-frequency or baseband signal. A mixer 19 generates a RF signal according to the intermediate-frequency or baseband signal and an oscillating frequency generated by an oscillator 20. The RF signal is amplified by a power amplifier (PA) 21 and is transmitted by the antenna 11.

Figure 2:
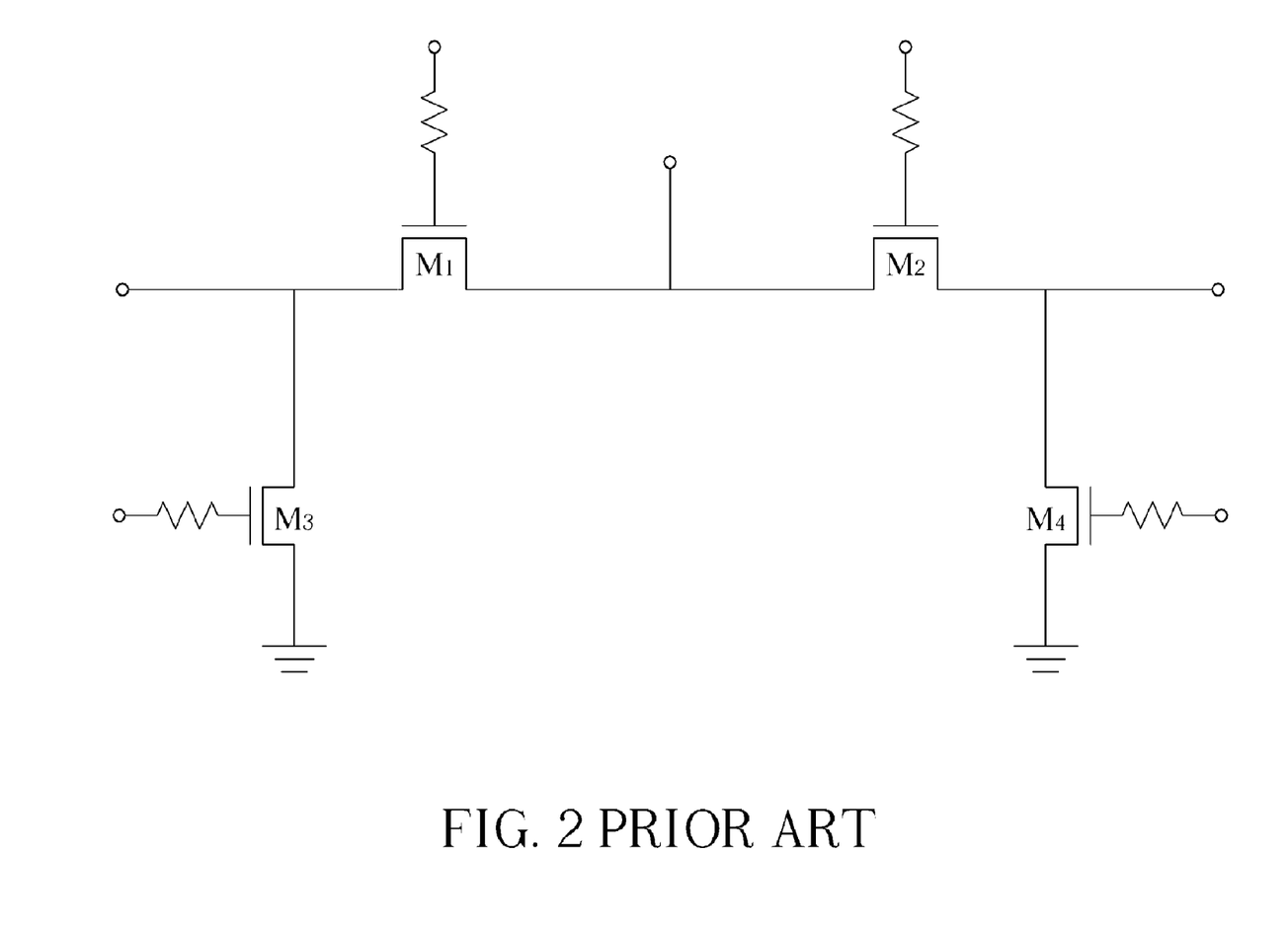
FIG. 2 is a schematic diagram of a conventional T/R switch.

Please refer to FIG. 2. FIG. 2 is a schematic diagram of a conventional T/R switch. The T/R switch can be divided into a series type and a shunt/series type. FIG. 2 shows a shunt/series type T/R switch, including four transistors M1, M2, M3, and M4. The transistors M1 and M2 are coupled in series for transmission and isolation. When the transistor M1 is turned on, the transistor M2 is turned off. When the transistor M1 is turned off, the transistor M2 is turned on. In addition, the transistors M3 and M2 are turned on at the same time. Thus, the low impedance is generated at the isolated terminal to provide a path to the ground so as to reduce the signal loss. Similarly, the transistors M4 and M1 are turned on at the same time. For the transistors M1 and M2, when the channel of the transistor is turned on, the resistance from the drain to the source becomes smaller as the size of the transistor increases. Thus, the insertion loss decreases but the parasitic effects of the substrate increases. The insertion loss decreases to a minimum and increases again because of the parasitic effects. When the channel of the transistor is turned off, the capacitance from the drain to the source becomes greater as the size of the transistor increases so as to reduce the isolation.

SUMMARY OF THE INVENTION

According to a embodiment of the present invention, a T/R switch circuit with high power-handling capability, for coupling a first node to a second node or a third node, comprises a first transistor, a second transistor, a third transistor, a fourth transistor, and a power detector. A source of the first transistor is coupled to the first node. A drain of the first transistor is coupled to the second node and receiving a first bias. A gate of the first transistor receives a first control voltage. A source of the second transistor is coupled to the first node. A drain of the second transistor is coupled to the third node and receiving the first bias. A gate of the second transistor receives a second control voltage. A source of the third transistor receives a second bias. A drain of the third transistor is coupled to the second node and receives the first bias. A gate of the third transistor receives the second control voltage. A source of the fourth transistor receiving the second bias, a drain of the fourth transistor is coupled to the third node and receives the first bias. A gate of the fourth transistor receives the first control voltage. The power detector detects power of output signals of the second node and the third node so as to adjust the first control voltage, the second control voltage, the first bias, and the second bias.

According to another embodiment of the present invention, a RF transceiver comprises an antenna, a receiver, a baseband circuit, a transmitter, and a T/R switch circuit. The antenna receives or transmits an analog signal. The receiver converts the analog signal to a digital signal. The baseband circuit is coupled to the receiver, for processing the digital signal. The transmitter is coupled to the baseband circuit, for converting the digital signal to the analog signal. The T/R switch circuit couples the antenna to the receiver or the transmitter. The T/R switch circuit is coupled to the baseband circuit for receiving biases provided by the baseband circuit.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
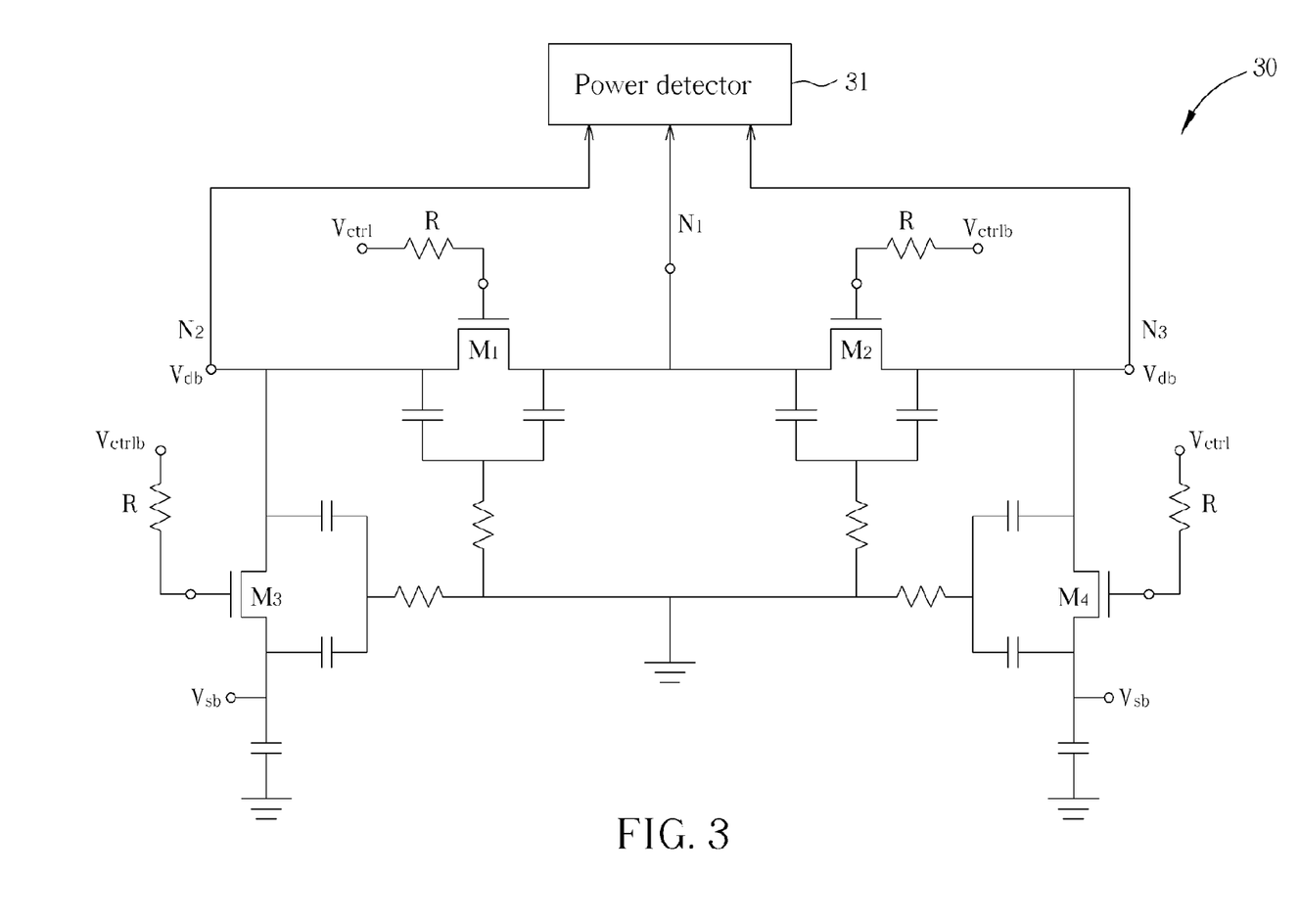
FIG. 3 is a schematic diagram of a T/R switch 30 according to the present invention.

Please refer to FIG. 3. FIG. 3 is a schematic diagram of a T/R switch 30 according to the present invention. The T/R switch 30 may comprise three nodes N1, N2, and N3. The first node N1 is coupled to an antenna. The second node N2 is coupled to a receiver. The third node N3 is coupled to a transmitter. The T/R switch 30 comprises four transistors M1, M2, M3, M4, and a power detector 31. The source of the first transistor M1 is coupled to the first node N1. The drain of the first transistor M1 is coupled to the second node N2 and receives a first bias Vdb. The gate of the first transistor M1 receives a first control voltage Vctrl. The source of the second transistor M2 is coupled to first node N1. The drain of the second transistor M2 is coupled to third node N3 and receives the first bias Vdb. The gate of the second transistor M2 receives a second control voltage Vctrlb. The source of the third transistor M3 receives a second bias Vsb. The drain of the third transistor M3 is coupled to second node N2 and receives the first bias Vdb. The gate of the third transistor M3 receives the second control voltage Vctrlb. The source of the fourth transistor M4 receives the second bias Vsb. The drain of the fourth transistor M4 is coupled to third node N3 and receives the first bias Vdb. The gate of the fourth transistor M4 receives the first control voltage Vctrl. In addition, the bias resistors R provide DC bias paths for the transistor M1, M2, M3, and M4.

Key figures of merit of an RF switch are the insertion loss and the 1 dB compression point (P1 dB). Transistor on-resistance is one of the dominant factors determining insertion loss. Because of this, only n-channel MOS transistors are utilized in the design. The drain-to-body and source-to-body junction capacitances of the transistors and the associated parasitic resistances due to the conductive nature of bulk silicon substrates are critical factors determining the insertion loss. For CMOS T/R Switch, maintaining the reverse bias across source/drain-to-substrate junction is a critical factor to limit the power handling capability due to the conductive nature of silicon substrates. Forward biasing the junctions can limit P1 dB as well as trigger latch-up. The switch power handling capability depends on the bias of TX and RX nodes. The power handling capability of the T/R switch 30 can be limited by potentially three effects: 1) the input signal is so large that drain/source-to-body junctions of the transistors M1 and M2 are forward biased; 2) the transistors M3 or M4 is unintentionally turned on and input signal has a path to the ground when the input signal is large enough; 3) the voltage across gate oxide is too large to guarantee its long term time-dependent dielectric breakdown (TDDB) reliability. To prevent condition 2 from occurring, the VGS/VGD of the transistor M3 (DC+AC) should be always kept below the threshold voltage or low enough. Thus, in the embodiment of the present invention, the power detector 31 can detect the output signal power of the T/R switch 30 to adjust the first control voltage Vctrl, the second control voltage Vctrlb, the first bias Vdb, and the second bias Vsb, so as to meet the requirement of high transmitted output power and low insertion loss.

Figure 4:
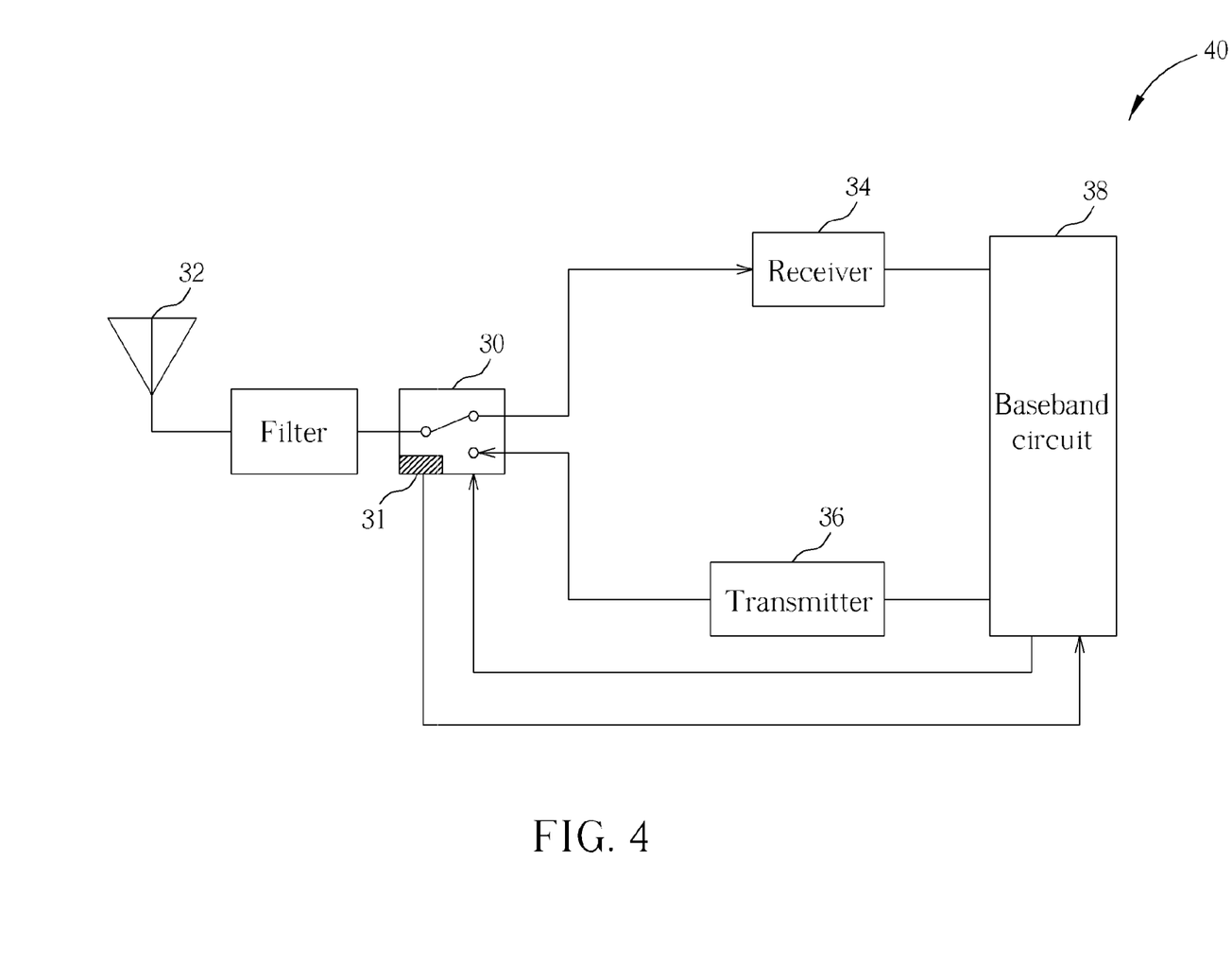
FIG. 4 is a schematic diagram of a RF transceiver according to the present invention.

Please refer to FIG. 4. FIG. 4 is a schematic diagram of a RF transceiver 40 according to the present invention. The RF transceiver 40 comprises an antenna 32, a receiver 34, a transmitter 36, a baseband circuit 38 and a T/R switch circuit 30. The T/R switch circuit 30 couples the antenna 32 and the receiver 34 or couples the antenna 32 and the transmitter 36. The output signal information, such as power levels or linearity, is detected from the output of T/R switch circuit 30 and thus feedbacks into the baseband circuit 38. The power detector 31 converts RF signal levels into DC voltage levels. From DC voltage levels, the baseband circuit 38 can determine the output RF power levels of the T/R switch circuit 30. According to the requirement of transmitted output power of the RF transceiver 40, the baseband circuit 38 provides the new first control voltage Vctrl, second control voltage Vctrlb, first bias Vdb, and second bias Vsb to the T/R switch circuit 30. Thus, the T/R switch circuit 30 can exhibit both high power-handling capability and low insertion loss.

Figure 5:
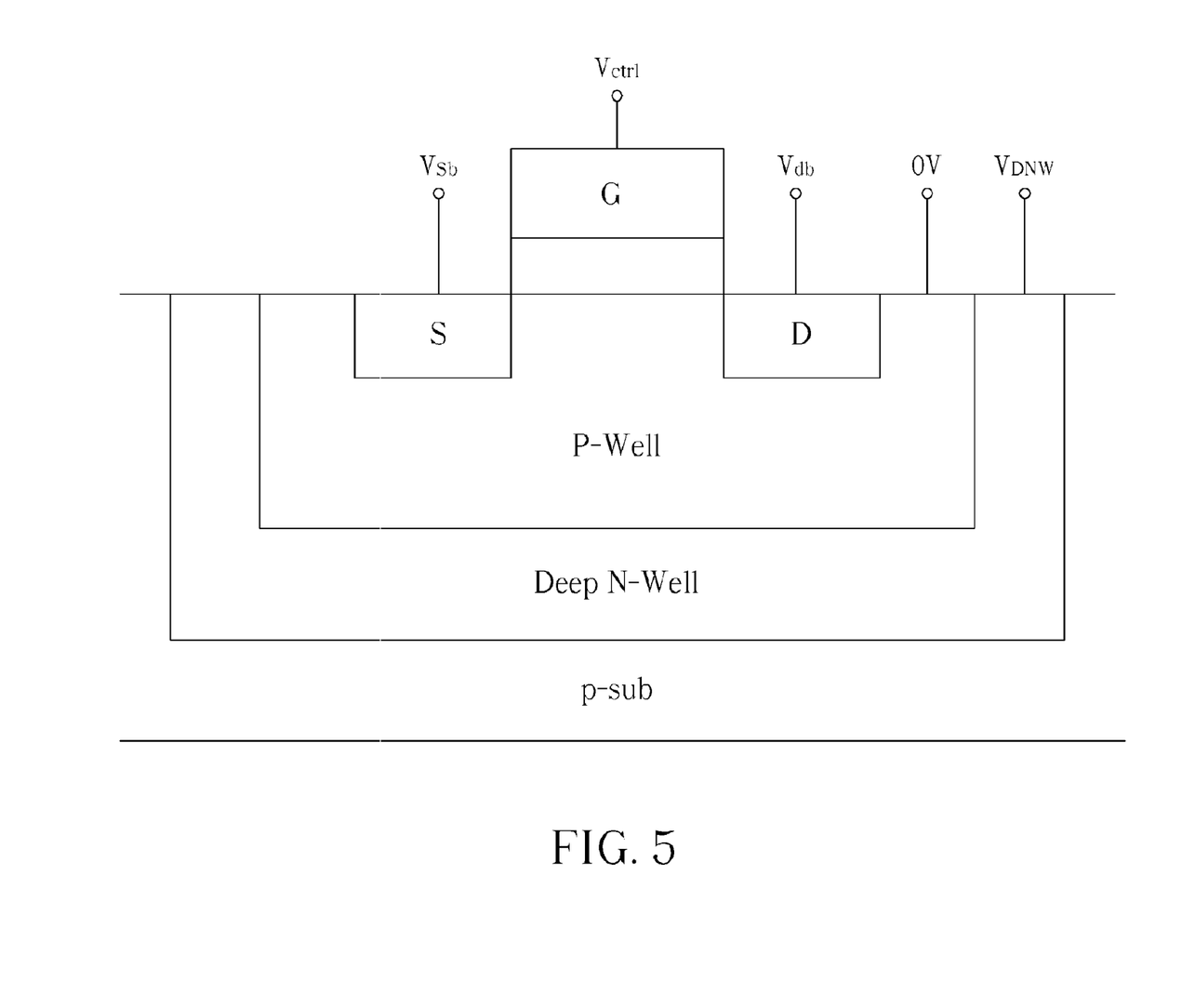
FIG. 5 is a cross-sectional diagram of the transistor M3/M4 in FIG. 3.
Figure 6:
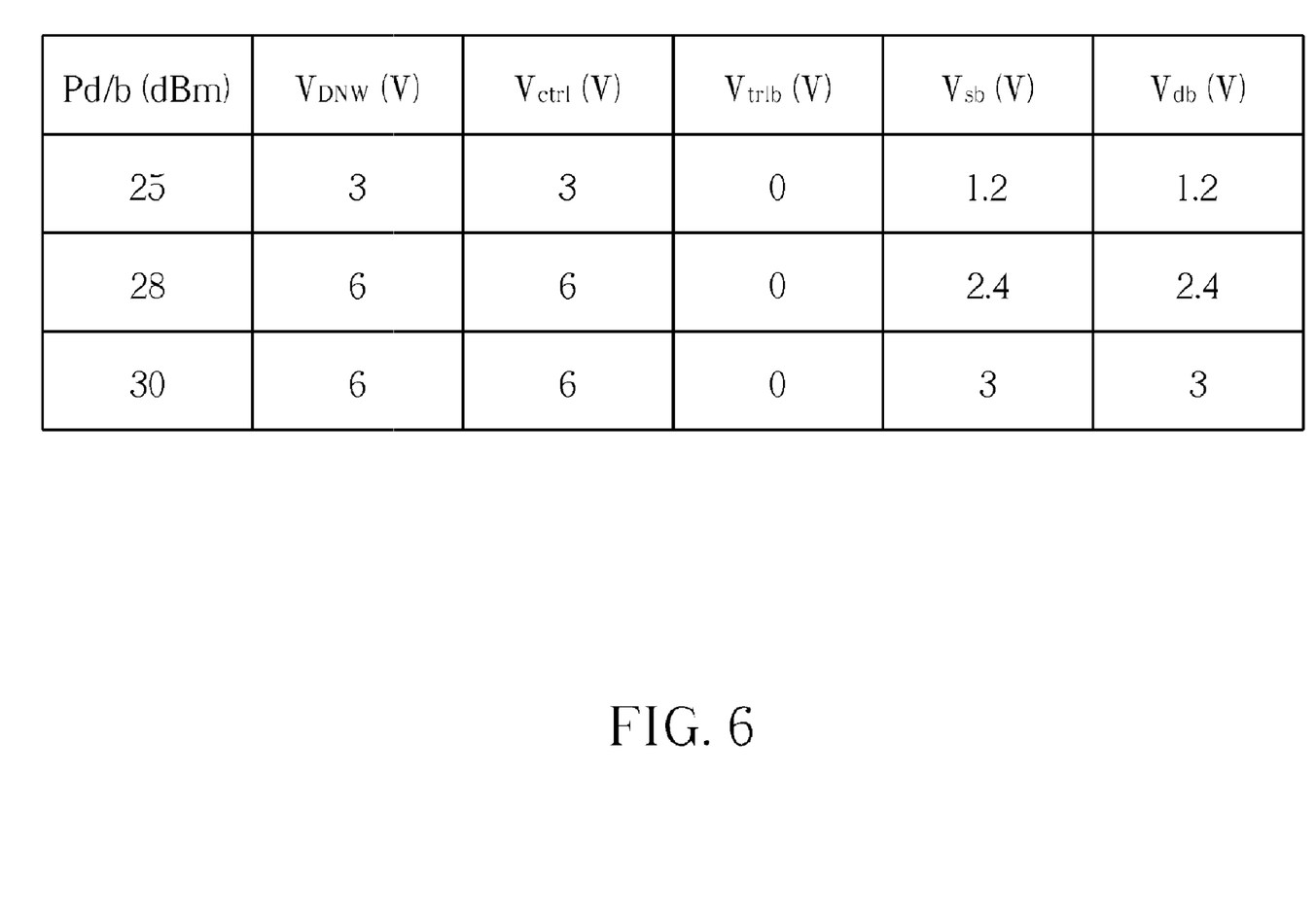
FIG. 6 is a table of DC biases for the T/R switch circuit.

Please refer to FIG. 5 and FIG. 6. FIG. 5 is a cross-sectional diagram of the transistor M3/M4 in FIG. 3. FIG. 6 is a table of DC biases for the T/R switch circuit 30. Basically, static biasing can be regarded as a simple representation of adaptive biasing. In order to meet the requirement of the high transmission output power, the higher DC voltage levels are necessary for the first control voltage Vctrl, the second control voltage Vctrlb, the first bias Vdb, and the second bias Vsb. The charge pump can provide the higher voltages. Under the fixed bias condition, drain/source-to-body junctions of the transistors M1 and M2 will not be forward-biased when the voltage swing of the input signal is large. Furthermore, the transistor M3 or M4 will be unintentionally turned on. For adaptive biasing, the baseband circuit 38 will receive the detected DC voltage level from the output of the T/R switch circuit 30. Thus, the baseband circuit 38 can determine if the power level is high enough. If the T/R switch circuit 30 limits the output power, the baseband circuit 38 will dynamically adjust all biases of the T/R switch circuit 30. In this embodiment, the power levels (P1 dB) are 25 dBm, 28 dBm, and 30 dBm, for example. The adaptive voltages for the first control voltage Vctrl, the second control voltage Vctrlb, the first bias Vdb, and the second bias Vsb are as shown in FIG. 6.

Figure 7:
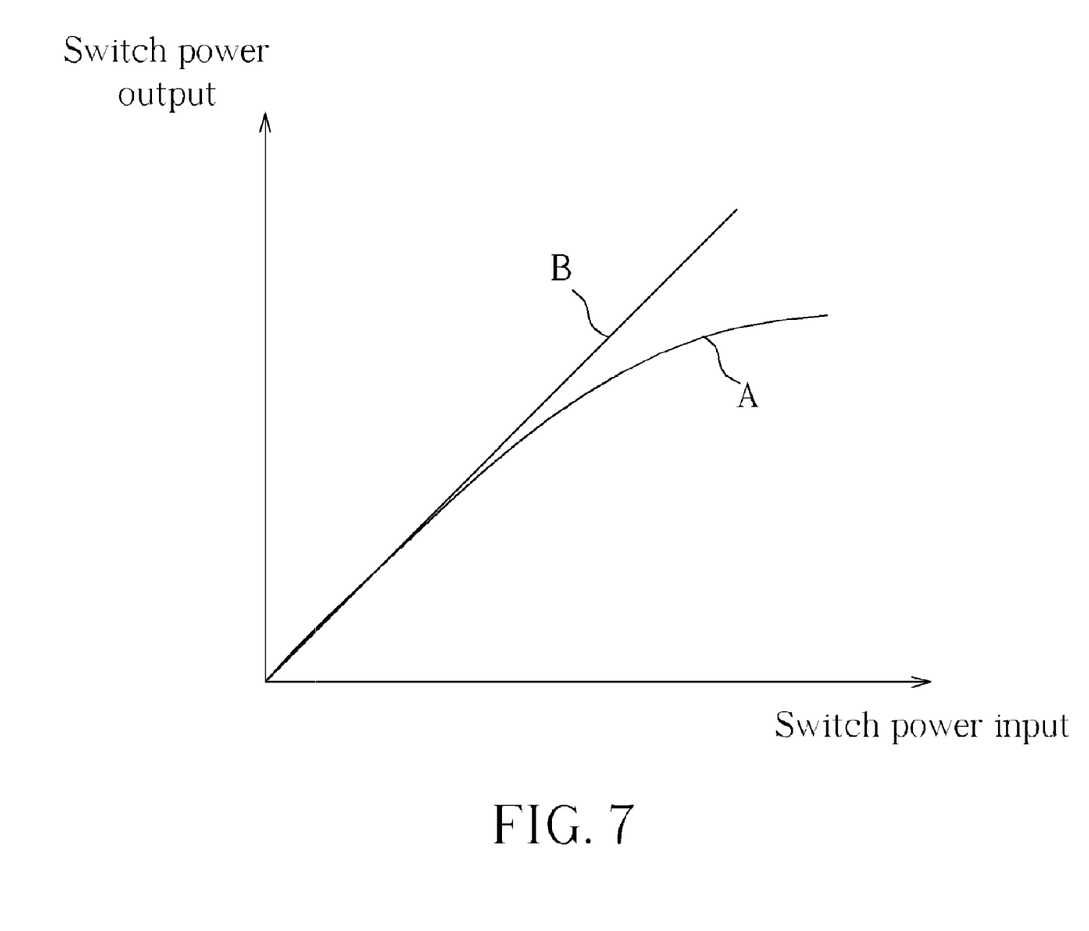
FIG. 7 is a schematic diagram of the power transfer curves of the T/R switch circuit.

Please refer to FIG. 7. FIG. 7 is a schematic diagram of the power transfer curves of the T/R switch circuit 30. Without adaptive biasing, the power transfer curve of the T/R switch circuit 30 is the curve A. With the help of adaptive biasing, the transfer curve of the T/R switch circuit 30 is the curve B. Thus, the linearity will be greatly improved and the insertion loss will be reduced in adaptive biasing condition. According to the embodiment of the present invention, the T/R switch circuit 30 with adaptive biasing has 30.46-dBm input 1 dB compression point and 0.54-dB insertion loss.

In conclusion, the present invention provides a RF transceiver having a T/R switch circuit capable of processing the high power signals. The T/R switch circuit uses the adaptive biasing, so the T/R switch circuit has high power-handling capability and low insertion loss. The RF transceiver comprises an antenna, a receiver, a baseband circuit, a transmitter, and a T/R switch circuit. The receiver converts a received analog signal to a digital signal. The transmitter converts the digital signal to the analog signal transmitted by the antenna. The T/R switch circuit is used for coupling the antenna and the receiver or coupling the antenna and the transmitter. The T/R switch circuit is coupled to the baseband circuit so as to receive biases provided from the baseband circuit. The T/R switch circuit comprises four transistors and a power detector. The power detector detects the power of the output signal of the T/R switch circuit, so that the baseband circuit can adjust biases provided to the T/R switch circuit according to the power of the output signal. Thus, the T/R switch circuit can achieve the high power-handling capability and low insertion loss.

Those skilled in the art will readily observe that numerous modifications and alterations of the device and method may be made while retaining the teachings of the invention.

What is claimed is:

1. A T/R switch circuit for coupling a first node to a second node or a third node, comprising:
   a first transistor, a source of the first transistor being coupled to the first node, a drain of the first transistor being coupled to the second node and receiving a first bias, a gate of the first transistor receiving a first control voltage;
   a second transistor, a source of the second transistor being coupled to the first node, a drain of the second transistor being coupled to the third node and receiving the first bias, a gate of the second transistor receiving a second control voltage;
   a third transistor, a source of the third transistor receiving a second bias, a drain of the third transistor being coupled to the second node and receiving the first bias, a gate of the third transistor receiving the second control voltage;
   a fourth transistor, a source of the fourth transistor receiving the second bias, a drain of the fourth transistor being coupled to the third node and receiving the first bias, a gate of the fourth transistor receiving the first control voltage; and
   a power detector for detecting power of output signals of the second node and the third node so as to adjust the first control voltage, the second control voltage, the first bias, and the second bias;
   wherein when the power of the output signals increases, the first bias and the second bias are increased.

2. The T/R switch circuit of claim 1, wherein the first control voltage and the second control voltage are complementary voltages.

3. The T/R switch circuit of claim 1, wherein the first node is coupled to an antenna, the second node is coupled to a transmitter, and the third node is coupled to a receiver.

4. The T/R switch circuit of claim 1, wherein the power detector transmits the power of the output signals to a baseband circuit so that the baseband circuit can adjust the first control voltage, the second control voltage, the first bias, and the second bias.

5. A RF transceiver, comprising:
   an antenna for receiving or transmitting an analog signal;
   a receiver for converting the analog signal to a digital signal;
   a baseband circuit, being coupled to the receiver, for processing the digital signal;
   a transmitter, being coupled to the baseband circuit, for converting the digital signal to the analog signal; and
   a T/R switch circuit, comprising:
      a first transistor, a source of the first transistor being coupled to the antenna, a drain of the first transistor being coupled to the receiver and receiving a first bias provided by the baseband circuit, a gate of the first transistor receiving a first control voltage;
      a second transistor, a source of the second transistor being coupled to the antenna, a drain of the second transistor being coupled to the transmitter and receiving the first bias, a gate of the second transistor receiving a second control voltage;
      a third transistor, a source of the third transistor receiving a second bias provided by the baseband circuit, a drain of the third transistor being coupled to the receiver and receiving the first bias, a gate of the third transistor receiving the second control voltage;
      a fourth transistor, a source of the fourth transistor receiving the second bias, a drain of the fourth transistor being coupled to the transmitter and receiving the first bias, a gate of the fourth transistor receiving the first control voltage; and
      a power detector for detecting power of output signals of the receiver and the transmitter so as to adjust the first control voltage, the second control voltage, the first bias, and the second bias;
   wherein when the power of the analog signal increases, the baseband circuit increases the first bias and the second bias.

6. The RF transceiver of claim 5, wherein the baseband circuit adjusts the first control voltage, the second control voltage, the first bias and the second bias according to the power of the analog signal.

7. The RF transceiver of claim 5, wherein the first control voltage and the second control voltage are complementary voltages.

8. A T/R switch circuit for coupling a first node to a second node or a third node, comprising:
   a first transistor, a source of the first transistor being coupled to the first node, a drain of the first transistor being coupled to the second node and receiving a first bias, a gate of the first transistor receiving a first control voltage;
   a second transistor, a source of the second transistor being coupled to the first node, a drain of the second transistor being coupled to the third node and receiving the first bias, a gate of the second transistor receiving a second control voltage;
   a third transistor, a source of the third transistor receiving a second bias, a drain of the third transistor being coupled to the second node and receiving the first bias, a gate of the third transistor receiving the second control voltage;
   a fourth transistor, a source of the fourth transistor receiving the second bias, a drain of the fourth transistor being coupled to the third node and receiving the first bias, a gate of the fourth transistor receiving the first control voltage; and
   a power detector for detecting power of output signals of the second node and the third node so as to adjust the first control voltage, the second control voltage, the first bias, and the second bias;
   wherein the power detector transmits the power of the output signals to a baseband circuit so that the baseband circuit can adjust the first control voltage, the second control voltage, the first bias, and the second bias.

9. The T/R switch circuit of claim 8, wherein the first control voltage and the second control voltage are complementary voltages.

10. The T/R switch circuit of claim 8, wherein the first node is coupled to an antenna, the second node is coupled to a transmitter, and the third node is coupled to a receiver.

* * * * *